US009118679B2

(12) United States Patent
McClain et al.

(10) Patent No.: US 9,118,679 B2
(45) Date of Patent: *Aug. 25, 2015

(54) ANALYTICS DATA COLLECTION WITH LOW INTEGRATION COST FOR DYNAMIC MESSAGE PASSING SYSTEMS

(71) Applicant: INTROSPEX, INC., Monarch Beach, CA (US)

(72) Inventors: Fred W. McClain, Cardiff, CA (US); Stephen Mickelsen, Encinitas, CA (US); Vishweshwar Ghanakota, Cardiff, CA (US)

(73) Assignee: Introspex Incorporated, Cardiff, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/531,135

(22) Filed: Nov. 3, 2014

(65) Prior Publication Data
US 2015/0120801 A1  Apr. 30, 2015

Related U.S. Application Data

(63) Continuation of application No. 13/707,508, filed on Dec. 6, 2012, now Pat. No. 8,910,190.

(60) Provisional application No. 61/567,592, filed on Dec. 6, 2011.

(51) Int. Cl.
G06F 9/44 (2006.01)
H04L 29/08 (2006.01)
G06F 9/54 (2006.01)

(52) U.S. Cl.
CPC ............... *H04L 67/10* (2013.01); *G06F 9/546* (2013.01)

(58) Field of Classification Search
None
See application file for complete search history.

(56) References Cited

U.S. PATENT DOCUMENTS

| 5,581,684 | A  | * | 12/1996 | Dudzik et al. | 715/708 |
| 6,112,280 | A  | * | 8/2000 | Shah et al. | 711/129 |
| 2006/0190924 | A1 | * | 8/2006 | Bruening et al. | 717/104 |
| 2007/0234289 | A1 |   | 10/2007 | Naroff et al. | |
| 2011/0238496 | A1 |   | 9/2011 | Gurbuxani et al. | |

OTHER PUBLICATIONS

Chisnall D., "A Modern Objective-C Runtime" Nov. 8, 2007, pp. 1-5.
Cortonesi M., et al "Objective-C Frameworks to Eiffel Converter", 2010, p. 1-61.

* cited by examiner

*Primary Examiner* — Andy Ho
*Assistant Examiner* — Abdou Seye
(74) *Attorney, Agent, or Firm* — Loza & Loza, LLP; Anthony G. Smyth

(57) ABSTRACT

A method, an apparatus, and a computer program product which capture and use analytics data relating to the internal activity of software programs executing in a message-passing runtime environment, such as that provided by Objective-C. The invention exploits the well documented interfaces of these environments together with their dynamic runtime capabilities to insert data collection and analysis code into an application without modification of the target application.

20 Claims, 13 Drawing Sheets

800

| Framework | Description |
|---|---|
| Accelerate | Accelerated math and DSP functions. |
| Accounts | Interfaces for managing access to a user's system accounts. |
| AddressBook | Functions for accessing the user's contacts database directly. |
| AddressBookUI | Classes for displaying the people picker and editor interfaces. |
| AudioToolbox | Interfaces for audio stream data and for playing and recording audio. |
| AudioUnit | Interfaces for loading and using audio units. |
| AVFoundation | Interfaces for playing and recording audio and video. |
| CFNetwork | Interfaces for accessing the network via Wi-Fi and cellular radios. |
| CoreAudio | Provides the Core Audio data types. |
| CoreBluetooth | Access low-power Bluetooth hardware. |
| CoreData | Interfaces for managing your application's data model. |
| CoreFoundation | Provides fundamental software services. |
| CoreGraphics | Interfaces for Quartz 2D. |
| CoreImage | Interfaces for manipulating video and still images. |
| CoreLocation | Interfaces for determining the user's location. |
| CoreMedia | Low-level routines for manipulating audio and video. |
| CoreMIDI | Low-level routines for handling MIDI data. |
| CoreMotion | Interfaces for accessing accelerometer and gyro data. |
| CoreTelephony | Routines for accessing telephony-related information. |
| CoreText | Text layout and rendering engine. |
| CoreVideo | Low-level routines for manipulating audio and video. |
| EventKit | Interfaces for accessing a user's calendar event data. |
| EventKitUI | Classes for displaying the standard system calendar interfaces. |
| ExternalAccessory | Interfaces for communicating with attached hardware accessories. |
| Foundation | Interfaces for managing strings, collections. |
| GameKit | Interfaces for managing peer-to-peer connectivity. |
| GLKit | Utility classes for building complex OpenGL ES applications. |
| iAd | Classes for displaying advertisements in your application. |
| MapKit | Classes for embedding a map interface into your application. |
| MediaPlayer | Interfaces for playing full-screen video. |
| MessageUI | Interfaces for composing and queuing email messages. |
| MobileCoreServices | Defines the uniform type identifiers (UTIs) supported by the system. |
| NewsstandKit | Interfaces for downloading magazine and newspaper content. |
| OpenAL | Interfaces for OpenAL, a cross-platform positional audio library. |
| OpenGLES | Interfaces for OpenGL ES. |
| QuartzCore | The Core Animation interfaces. |
| QuickLook | Interfaces for previewing files. |
| Security | Interfaces for managing certificates, keys, and trust policies. |
| StoreKit | Interfaces for handling the financial transactions. |
| SystemConfiguration | Interfaces for determining the network configuration of a device. |
| Twitter | Interfaces for sending tweets via the Twitter service. |
| UIKit | Classes and methods for the iOS application user interface layer. |

Preflighting a Request
  + canHandleRequest:
Loading Data Synchronously
  + sendSynchronousRequest:returningResponse:error:
Loading Data Asynchronously
  + connectionWithRequest:delegate:
  − initWithRequest:delegate:
  − initWithRequest:delegate:startImmediately:
  − start
Stopping a Connection
  − cancel
Runloop Scheduling
  − scheduleInRunLoop:forMode:
  − unscheduleFromRunLoop:forMode:
Connection Authentication
  − connection:canAuthenticateAgainstProtectionSpace: delegate method
  − connectionShouldUseCredentialStorage: delegate method
  − connection:didCancelAuthenticationChallenge: delegate method
  − connection:didReceiveAuthenticationChallenge: delegate method
Connection Data and Responses
  − connection:didReceiveData: delegate method
  − connection:didReceiveResponse: delegate method
  − connection:willCacheResponse: delegate method
  − connection:willSendRequest:redirectResponse: delegate method
Connection Completion
  − connection:didFailWithError: delegate method
  − connectionDidFinishLoading: delegate method

FIG. 9

ANALYTICS DATA COLLECTION WITH LOW INTEGRATION COST FOR DYNAMIC MESSAGE PASSING SYSTEMS

CROSS-REFERENCE TO RELATED APPLICATIONS

This application is a continuation of, and claims the benefit of U.S. patent application Ser. No. 13/707,508, filed on Dec. 6, 2012, which is now U.S. Pat. No. 8,910,190, which claimed priority from U.S. Provisional Application Ser. No. 61/567,592 filed on Dec. 6, 2011, and which is expressly incorporated by reference herein in its entirety.

BACKGROUND

1. Field

The present disclosure relates generally to message passing computer programming languages and systems, and more particularly, to systems and methods for instrumenting, observing, analyzing and reporting behavior of message passing computer systems.

2. Background

Computer programs deployed on Internet servers, personal computers and mobile devices are playing an increasing role in a broad spectrum of commerce and social activities. It has become increasingly important for the producers of these software programs to understand the performance of its applications and the behavior of users of those applications. Software manufacturers are challenged to deploy reliable and effective programs while responding to rapid market changes. Detailed data analysis of software programs throughout the life cycle stages of development, debugging, deployment, upgrading, marketing, operations and end-of-life has become important to the overall success of many software applications.

Conventional solutions require the integration of tracking software within the target application. This tracking software in turn generates the data required to understand how a product is being used by its customers, and the nature of software bugs and other computing environmental concerns. While the benefits realized from such analytics data are large there are inherent problems associated with the conventional solution. The collection of analytics data typically requires the addition of tracking and reporting software throughout the target application. The process requires access to and modification of the applications source code. The requirements for the tracking software generally require the cooperation of multiple groups and individuals within an organization adding further weight to implementation complexity. This detailed instrumentation increases the scope and cost of the software engineering process all the while reducing responsiveness to market forces.

Moreover, when instrumented applications are deployed, conventional solutions require wholesale replacement of an application to modify the nature of analytics data collected. Conventional solutions tend to have a 'one size fits all' approach and, unless highly customized applications are developed to cover the differing data collection requirements, all stake holders in the software lifecycle must typically be satisfied with a static set of analytics data. These restrictions make it difficult to quickly tune the data collected to different user communities or drill down into areas of interest identified by previously collected data or changes in the market.

Traditional computing environments create a fixed linkage between the code instructions to be executed at the time of compilation and linking. This fixed nature of traditional applications makes it difficult to modify or change the behavior of an application after it has been built, thereby necessitating that any instrumentation for collection of analytics data be built directly into application.

SUMMARY

In an aspect of the disclosure, systems, methods and apparatus are provided. The apparatus comprises one or more processing systems configured to maintain a library of modules in a non-transitory storage medium, change an implementation pointer maintained by the processing system, the implementation pointer corresponding to a function selector of a target function, and store the initial content of the implementation pointer in association with the at least one analytics function such that the processing system is caused to execute the target function after executing the at least one analytics function. The library of modules may include code for causing a processing system to perform a plurality of analytics functions, each analytics function being associated with a function selector. An initial content of the implementation pointer may be changed such that the processing system is caused to execute at least one analytics function of the plurality of analytics functions instead of the target function. The implementation pointer may be changed after the processing system has begun executing an application associated with the implementation pointer.

In an aspect of the disclosure, the code for causing the processing system to perform a plurality of analytics functions may be added to the library of modules after the processing system has begun executing the application.

In an aspect of the disclosure, the at least one analytics function may comprise a data collection function configured to update an execution history of the target function, the execution history counting each execution of the target function. At least one analytics function may include a cataloging function configured to characterize each execution of the target function based on one or more parameters provided to the target function. The cataloging function may be configured to characterize at least one result of each execution of the target function.

In an aspect of the disclosure, the processing system may be configured to change one or more other implementation pointers maintained by the processing system. The one or more other implementation pointers may be changed by modifying an operational aspect of the application. The operational aspect of the application may relate to a menu provided to a user of the apparatus, a behavior of the apparatus, and/or power management of the apparatus.

In an aspect of the disclosure, At least one analytics function comprises a communications function that transmits information related to one or more operational aspects of the apparatus to a network. The information related to one or more operational aspects of the apparatus may include an analysis of user behavior associated with the apparatus. The information related to one or more operational aspects of the processing system may include an alert related to an error condition caused by the application. The alert may comprise include an execution history of the target function.

In an aspect of the disclosure, systems, methods and apparatus are provided. The apparatus comprises one or more processing systems configured to provide a library of analytics functions to a computing device, receive an execution history corresponding to one or more functions of the application, and cause the computing device to modify a behavior of the application while the application is running. The library of analytics functions may include functions configured to instrument an application that is currently running on the computing device In an aspect of the disclosure, the behavior of the application relates to an error condition detected in the application based on the execution history, a menu operation of the computing device, a user experience associated with the user device or another functional aspect of the computing device.

In an aspect of the disclosure, the processing system may cause the computing device to modify the behavior of the application by causing the application to display an advertisement on the computing device. The application is selected based on the execution history.

In an aspect of the disclosure, the processing system may cause the computing device to modify the behavior of the application by causing the computing device to modify a runtime version of the application without modifying a stored version of the application.

BRIEF DESCRIPTION OF THE DRAWINGS

FIG. 8 is a partial list of available frameworks.

FIG. 9 illustrates interface points for typical Framework (NSURLConnection).

DETAILED DESCRIPTION

Figure 1:
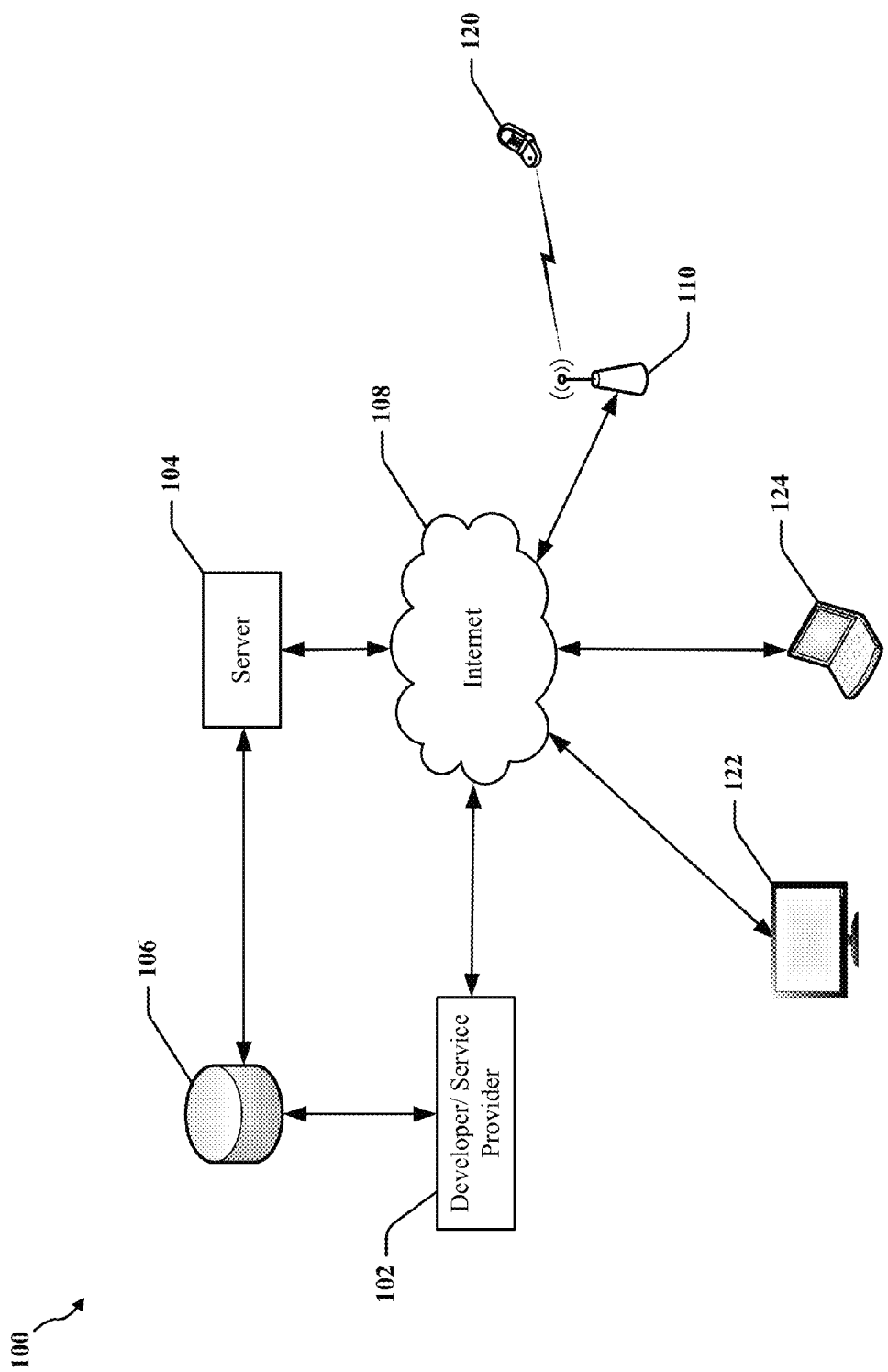
FIG. 1 is a diagram illustrating an example of a network environment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of the invention will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Certain embodiments provide systems, apparatus and methods that enable a minimally invasive and low cost method for collection and analysis of data associated with processing systems, computing environments and software programs operating on processing systems and in a variety of computing environments.

FIG. 1 is a conceptual diagram illustrating an example of a computing environment 100 that may employ certain aspects of the present invention. A developer 102 may produce applications that can be distributed to some combination of user equipment such as personal computer 124, mobile device 120 such as a mobile phone or other wireless device, and appliances such as television 122. User equipment may comprise any personal processing device, including gaming devices, communications devices, portable computing platforms, navigation systems, media players and so on. Appliances may be any device that performs a prescribed function and can include televisions, kitchen equipment, cable, satellite, streaming and other set-top devices, media players, home automation and/or security systems, automotive control and/or entertainment systems, and the like.

Applications provided by developer may involve the provision or receipt of services, typically provided by a server 104, which may be connected through a network such as the Internet 108. User equipment 120, 122 and/or 124 may be connected to other user equipment 120, 122 and/or 124 and/or to one or more network server 104 through the Internet or another network. Connections to networks may involve a wireless network, typically using a base station 110 that provides access to a wide area network, such as the Internet 108.

In certain embodiments, developers and/or service providers 102 may distribute applications and continue to monitor the performance of the applications and user equipment 120, 122 and 124 on which the applications are installed. In some embodiments, applications may be instrumented while executing on the user equipment 120, 122 or 124 such that performance and other information is collected and communicated to a server 104, which may analyze, aggregate, or otherwise process the data from one or more devices 120, 122 or 124. Applications may be instrumented to assist debug and development of the applications, to monitor performance of user equipment 120, 122 and 124, to profile use of the application or user equipment 120, 122 or 124 and to enable delivery of customized and optimized content based on histories of usage of the applications. In one example, instrumentation may be used to determine menu options and features that are frequently or infrequently used such that user options may be modified to reflect user behaviors. In another example, customer support operations may add instrumentation "on-the-fly" to assist in detecting causes of current failures or problems associated with an application.

Certain embodiments of the invention may be deployed in message-passing computing environments. One example of a message-passing computing environment comprises certain computing devices, and/or eco-systems produced and marketed by Apple Inc. Such devices and systems may employ message-passing operating systems and certain software applications may be produced using compilers and other development tools employed by developers 102. For the purposes of this discussion, the Objective-C programming language, its runtime environment and related development tools are described in detail as an example of a message-passing programming and/or runtime environment. However, the principles disclosed may be applied to any suitable message-passing programming and runtime environment and/or to certain programming and runtime environments that do not use message-passing in the conventional sense.

Systems and applications that employ message-passing may delay final linking between functional code blocks and corresponding function pointers until runtime. The dynamic nature of message-passing systems and applications may be leveraged to provide a mechanism that can update applications at runtime by inserting new code into the application at runtime. The new code may include modules and/or libraries that can capture, communicate and use analytics data relating to the internal activity of software programs executing in the message passing runtime environment of Objective-C.

In some embodiments, certain capabilities of message-passing systems may be exploited to insert data collection and analysis code into an application during the application's launch process. Certain applications designed for message-passing environments make use of extensive and well documented frameworks and libraries. Certain embodiments of the invention exploit information acquired from Objective-C interfaces to gain knowledge of the underlying intent and/or purpose of collected data.

In certain embodiments, code blocks are provided for inclusion in applications to enable data collection, data analysis functions and user interface elements. Certain of the code blocks may be provided in a compiled library and inserted into a preexisting application while the application is running. Accordingly, a software developer may collect performance, usage and related analytics data to facilitate continued development and/or monitoring of applications without modifying the source code of deployed applications. The impact of the data collection on an executing application can be minimized through on-the-fly customization of the application that allows targeted data collection to be added and removed according to data collection needs. In a networked environment a profile of data collected can be updated remotely. In some embodiments, the collected data may be processed, aggregated or otherwise consolidated to reduce the volume of collected data collected. In one example, consolidation may be performed around a plurality of predefined or selectable data points.

Figure 2:
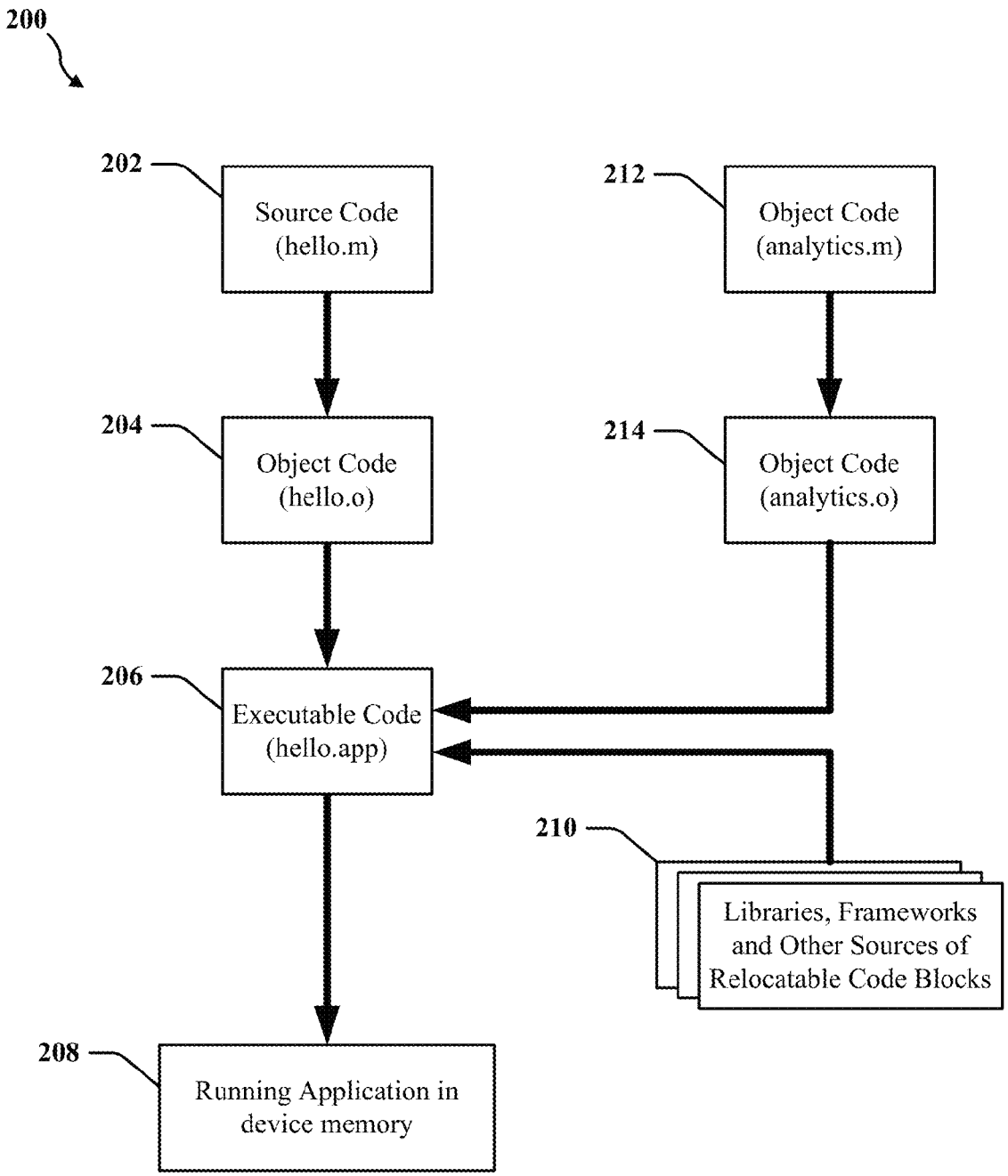
FIG. 2 is a flowchart illustrating a method for including software libraries into an application on a processing device.

FIG. 2 comprises a flow diagram 200 that illustrates a compiling process, performed by compiler and other software development tools. Source code 202 may be input to the compiler which may produce relocatable object code 204 from the source code 202. Source code 202 may be written for Objective-C or another message-passing system. The object code 204 may then be assembled by a linker to produce an executable file 206, which typically includes portions of libraries and frameworks 210 with object code 204. The executable file 206 may be transferred by a loader to storage, such as main memory of a device on which the loaded application 208 is to be executed. Third-party source code 212 may be compiled into relocatable object code 214. In conventional systems, the linker may merge the relocatable object code 214 with the relocatable code 204 generated from the primary source code 202. This merging enables code blocks generated by the third-party source code to be referenced by the primary source code without a requirement for the third-party source code to be directly incorporated into the primary source code.

Figure 3:
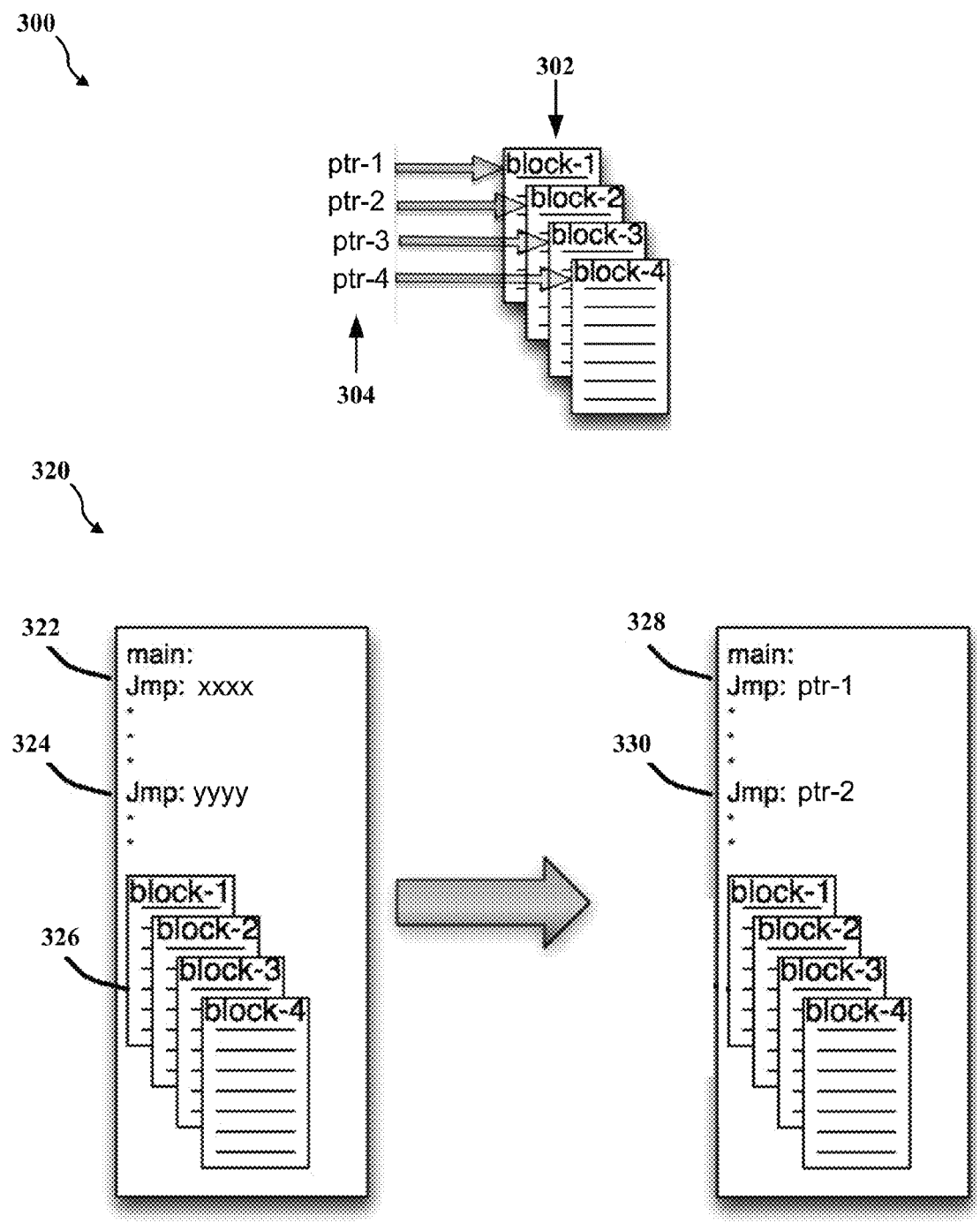
FIG. 3 illustrates relocatable code blocks and associated pointers.

FIG. 3 illustrates an example in which four relocatable code blocks 302 are associated with corresponding pointers 304. The associated object code 113 is shown in more detail at 320. Function calls 322 and 324 may be created by a compiler which associates function calls 322 and 324 with placeholder pointers (labeled "xxxx" and "yyyy"). During the load/link process these placeholder pointers may be replaced with pointers to the actual addresses of the relocatable code blocks as illustrated by function calls 328 and 330. Conventional (e.g. non message-passing) systems may resolve relocatable code block references in this manner.

In certain embodiments of the invention, an Objective-C or other message-passing system may be employed in which resolution of function calls, which may be referred to herein as "method invocations," is deferred until runtime. The linkage between the method invocation and the code block executed can be changed during application execution. Certain embodiments take advantage of this property to insert custom code blocks into a running application.

Figure 4:
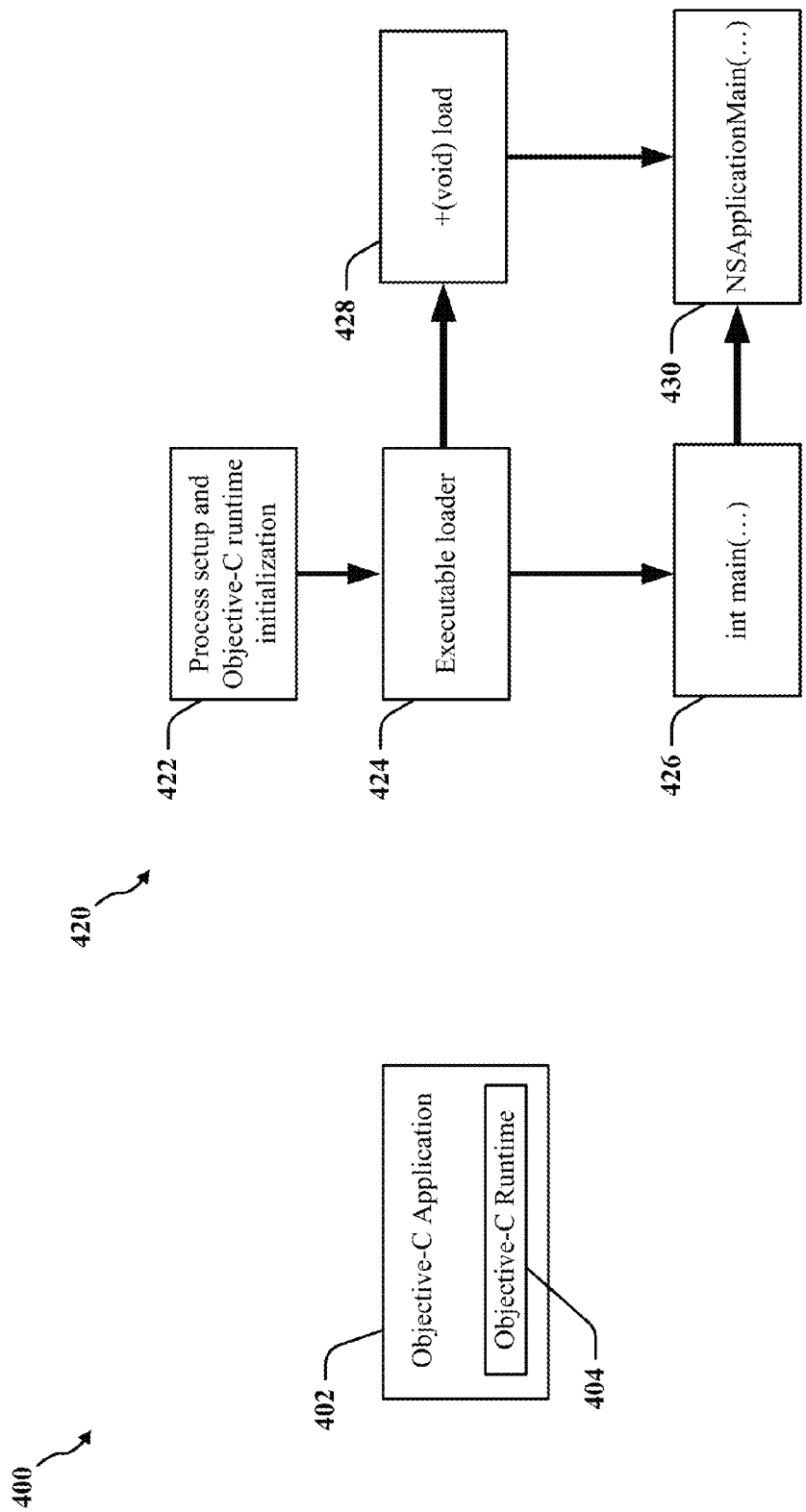
FIG. 4 illustrates linker/loader operation.

FIG. 4 is a diagram 400 illustrating the relationship between an Objective-C application 402 and an Objective-C runtime component 404 according to certain aspects of the invention. Each application 402 may have its own dedicated copy of the runtime component 404. The runtime component 404 performs a variety of low level services for the application, including the copying and/or loading of relocatable code blocks from the executable image. Additionally, the runtime component 404 may be used to move relocatable code blocks between objects of an application, and may provide methods for manipulating pointers to these code blocks.

The flow diagram 420 shows, in more detail, a process for application startup in an Objective-C system. At startup 422, the runtime component 404 initiates the loading of code blocks into memory that is usable at runtime. At 424, a runtime executable loader may accomplish loading through execution of a method, such as the "+load" method 428 on every object in the application. In turn, the +load method 428 may copy relocatable code blocks associated with a given object into memory. A single reference in the application program may cause the execution of the +load method 428 for any Framework or library included in an Objective-C application. Accordingly, this +load method 428 may be used to insert code blocks from the library into the target application. Since this occurs prior to execution of the main application 430, and Objective-C startup, the behavior of the application can be modified from its behavior at initial startup by code insertion.

In one example, a code extension mechanism named "Categories" provided by Objective-C may be used to extend the behavior of an existing object at Runtime. The present invention creates additional Categories for selected set of Objective-C Frameworks and Libraries. These additional Categories may include custom code for tracking and analysis of the Frameworks and Libraries extended by the custom Categories. FIG. 8 includes a table 800 listing a subset of certain Objective-C Frameworks employed in the Apple® iOS® operating system. Additional libraries, not shown, may be provided for Objective-C and/or other message-passing systems, and tracking code may be inserted in these libraries using through Categories. Typically, tracking code may be inserted in any library provided the library is adequately documents.

Figure 5:
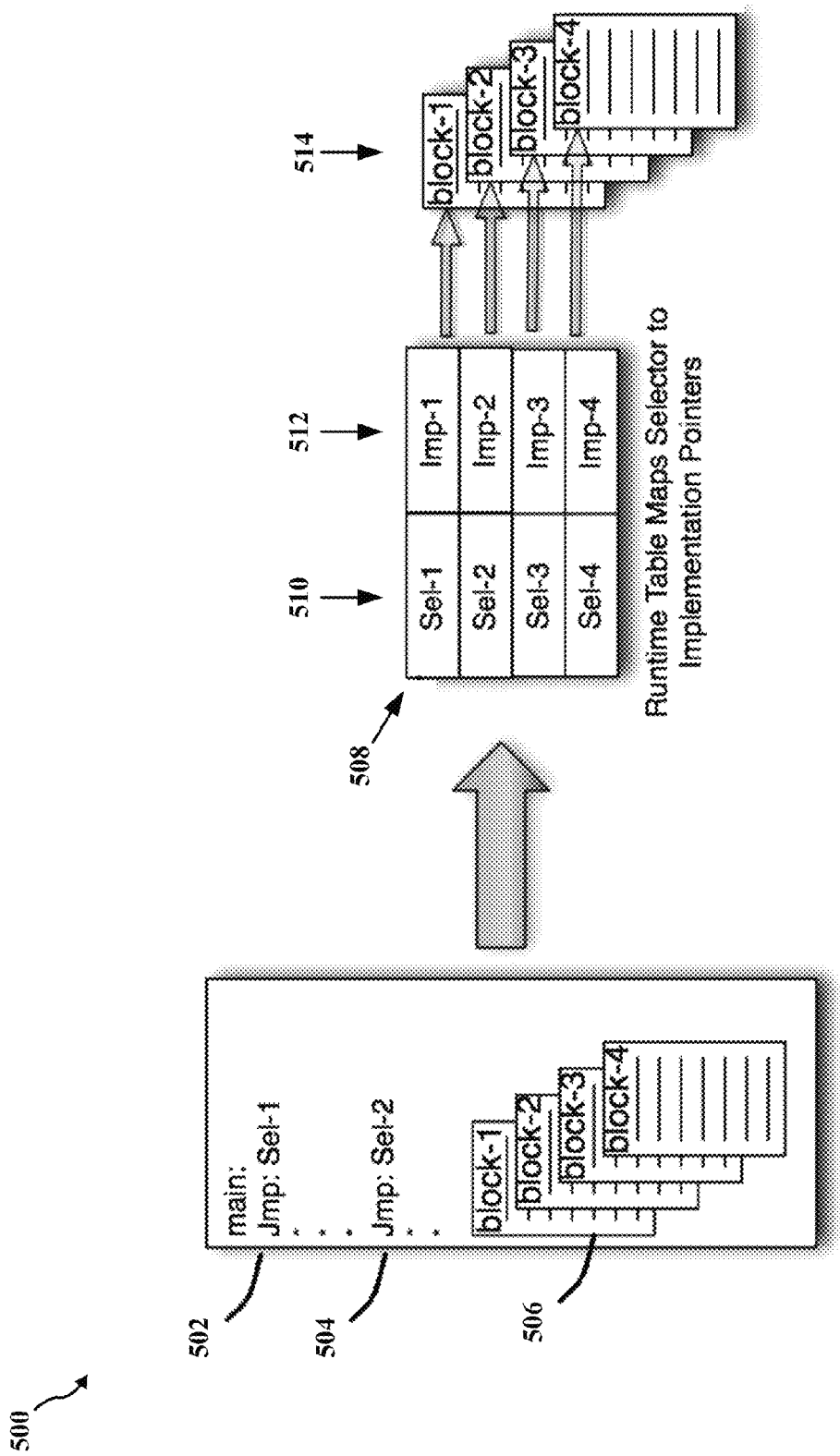
FIG. 5 depicts indirection layer enabled by message passing systems such as Objective-C.

FIG. 5 and is a diagram 500 illustrating an example of an Objective-C implementation according to certain aspects of the invention. The term Selector (or "Sel") is used to indicate the name of a function to be invoked, and the word Implementation (or "Imp") is used to indicate a pointer to a block of relocatable code blocks to be executed. The executable code provides a reference 510 to each Sel 502, 504 to be invoked. The Runtime component 404 may maintain a table 508 mapping each Sel 510 to an Imp pointer 512. For example, Sel-1 502 and Sel-2 504 may be referenced in the executable containing relocatable blocks 514. Table 508 illustrates a mapping from Sel-1 502 and Sel-2 504 to Implementation pointers Imp-1 and Imp-2, which in turn point to relocatable code blocks Block-1 and Block-2 respectively.

Figure 6:
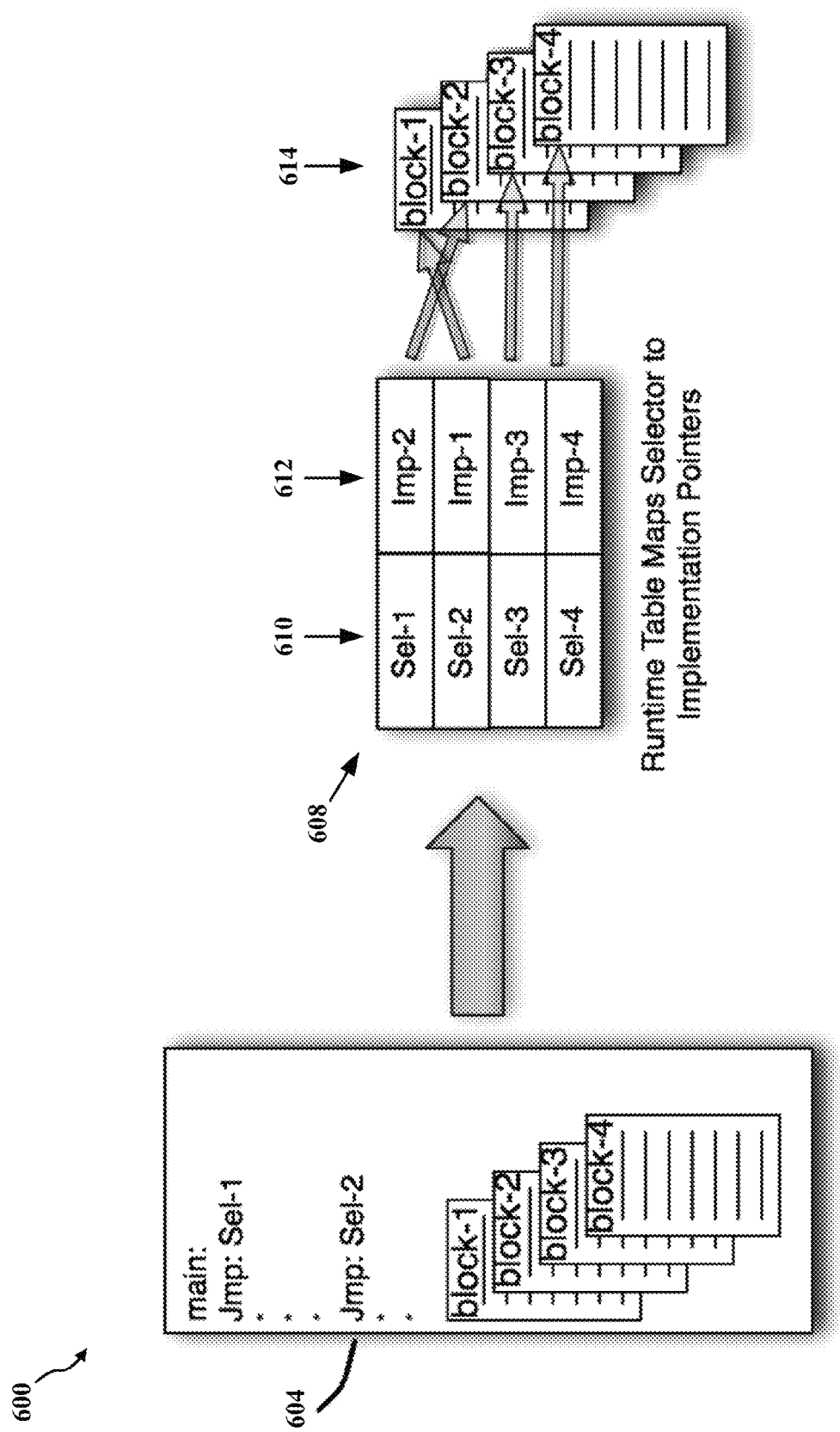
FIG. 6 illustrates Objective-C enables runtime exchange of implementation code blocks.

FIG. 6 is a diagram 600 illustrating an example of an Objective-C implementation according to certain aspects of the invention. In certain embodiments, the Objective-C Runtime may be used to exchange Implementation pointers in the Runtime table 608. As depicted, the Imp pointers 612 referenced by Sel-1 and Sel-2 are swapped in table 608, thereby enabling a change in behavior of the application. The Imp pointer 612 may be changed to point to a different code block. For example, the Imp pointer for Sel-2 604 may be changed to reference a code block derived from a library that may include analytics code, or that may change behavior of a user interface. Certain embodiments perform this exchange in the execution of the +load method of the Categories associated with each Framework to be analyzed.

Figure 7:
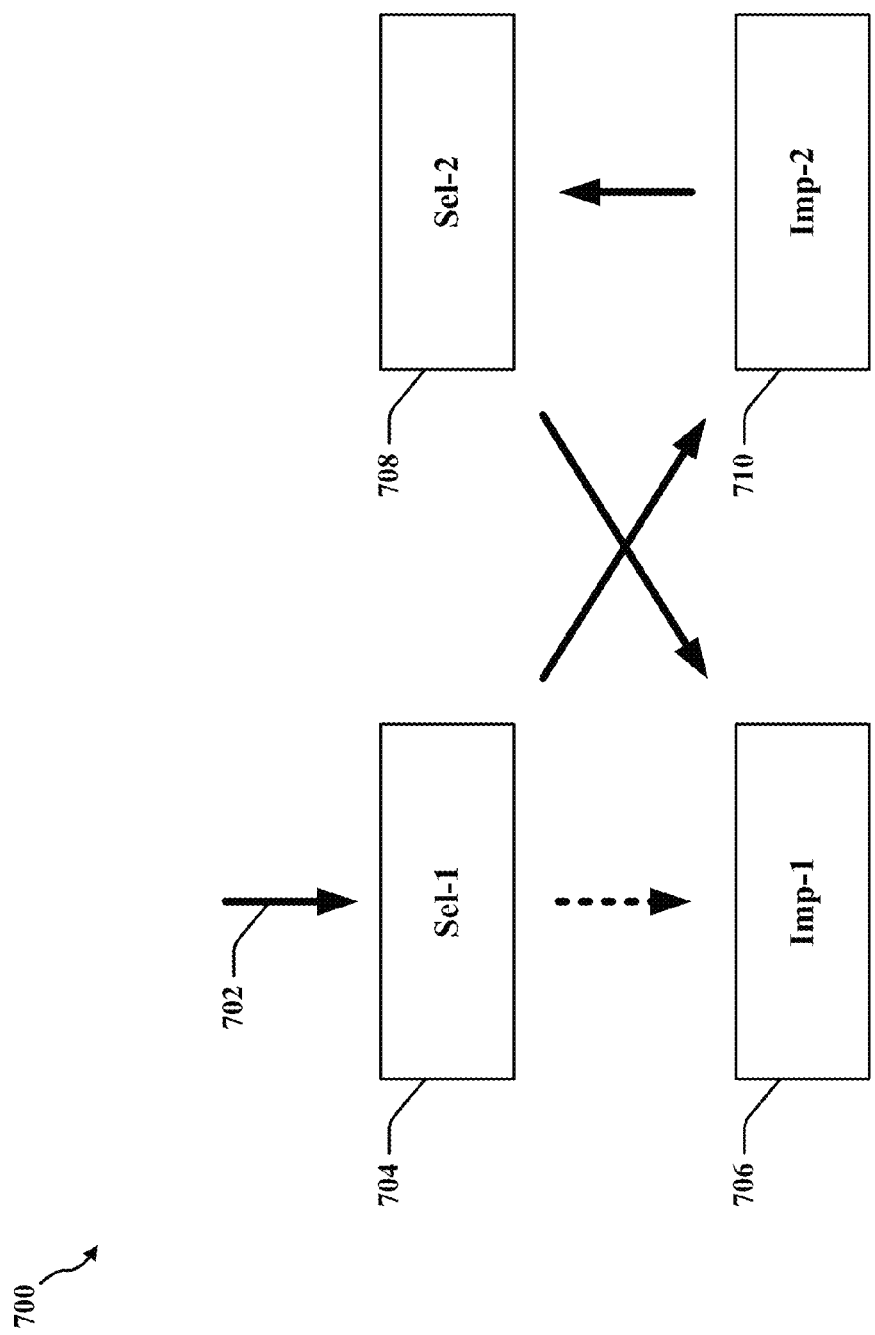
FIG. 7 illustrates Implementation code block exchange.

FIG. 7 is a diagram illustrating an example of pointer modification in more detail. The diagram 700 illustrates how an exchange (depicted in FIG. 6, for example) can result in the insertion of new code blocks in the program execution. Code execution flow 702 may cause Sel-1 704 to be invoked and, when Imp-1 706 and Imp-2 708 have been exchanged in table 608, the invocation of Sel-1 704 passes control to the code block pointed to by Imp-2 710, rather than to the original code block pointed to by Imp-1 706. The code block pointed to by Imp-2 710 may comprise relocatable code from a library, and may include instrumentation code, code that provides additional or different functionality to the application, and so on. In some embodiments, the library may comprise custom code used to track and analyze the target application. The code block code block pointed to by Imp-2 710 may include a reference to Sel-2 708, and Sel-2 706 may now invoke pointer Imp-1 706. Since the code block code block pointed to by Imp-1 706 is the original function associated with Sel-1, execution proceeds according to the original intent.

In certain embodiments, additional care is taken in the code block pointed to by Imp-2 710 to avoid disrupting the flow of the original application. Since this code block is effectively hidden from the original application, the application may be developed to avoid retaining or altering any objects of the original application. Developers employing certain techniques disclosed herein typically avoid creating code that generates or requires a large memory footprint and/or excessive CPU usage.

Certain aspects of the present invention are applicable to any Framework provided the Framework is documented, or otherwise discernible. For example, Frameworks may be monitored provided data collection specifics related to Objective-C interfaces to the Frameworks are documented or otherwise known. FIG. 8 includes examples of Frameworks that are well-documented and that can be fully instrumented with techniques disclosed herein, and typically without the cooperation of the original author of the Frameworks.

By way of example, FIG. 9 illustrates interface documentation for an "NSURLConnection" object, which is a member of the iOS Foundation framework. The 'initWithRequest:delegate" method shown in FIG. 9 may be used to create a new NSURLConnection and to assign a "delegate" to the connection. In some embodiments, an Imp pointer associated with 'initWithRequest:delegate" may be switched with an Imp pointer to a block of code from a library, such as an analytics or other library, and assigned a new Selector 'bm_initWithRequest:delegate." In this manner control is passed to the inserted code block from the library when any code in the original application uses the Sel 'initWithRequest:delegate." The complete documentation associated with FIG. 11 enables the code block in library to have full knowledge of the meaning of the parameters passed in the 'initWithRequest:delegate," enabling the code block of library to extract and record all desired associated details of the call. After collecting the data code block from library then reference the new Sel "bm_initWithRequest:delegate," returning control back to the flow intended in the original application.

Figure 10:
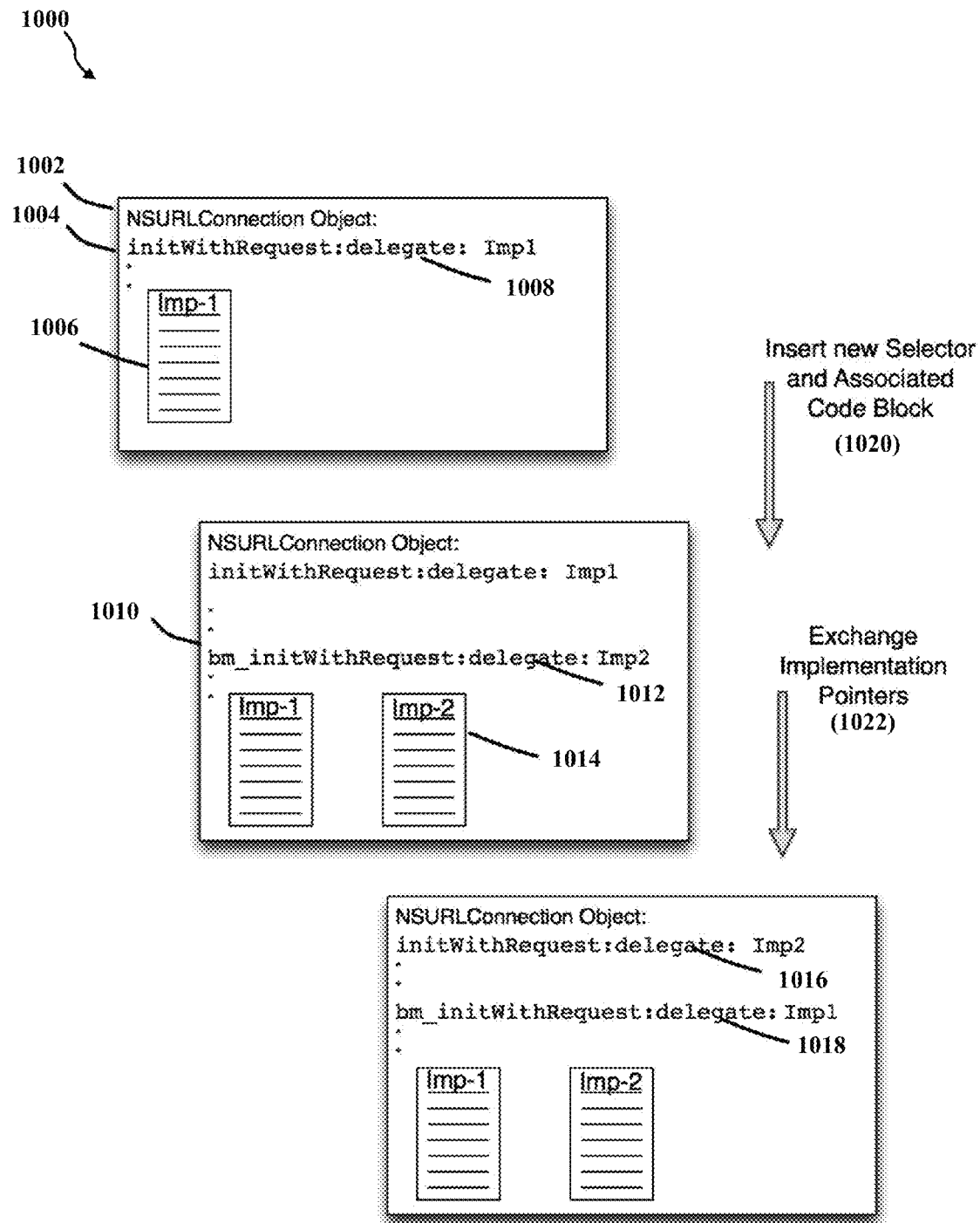
FIG. 10 illustrates code insertion for a Connection object.
Figure 11:
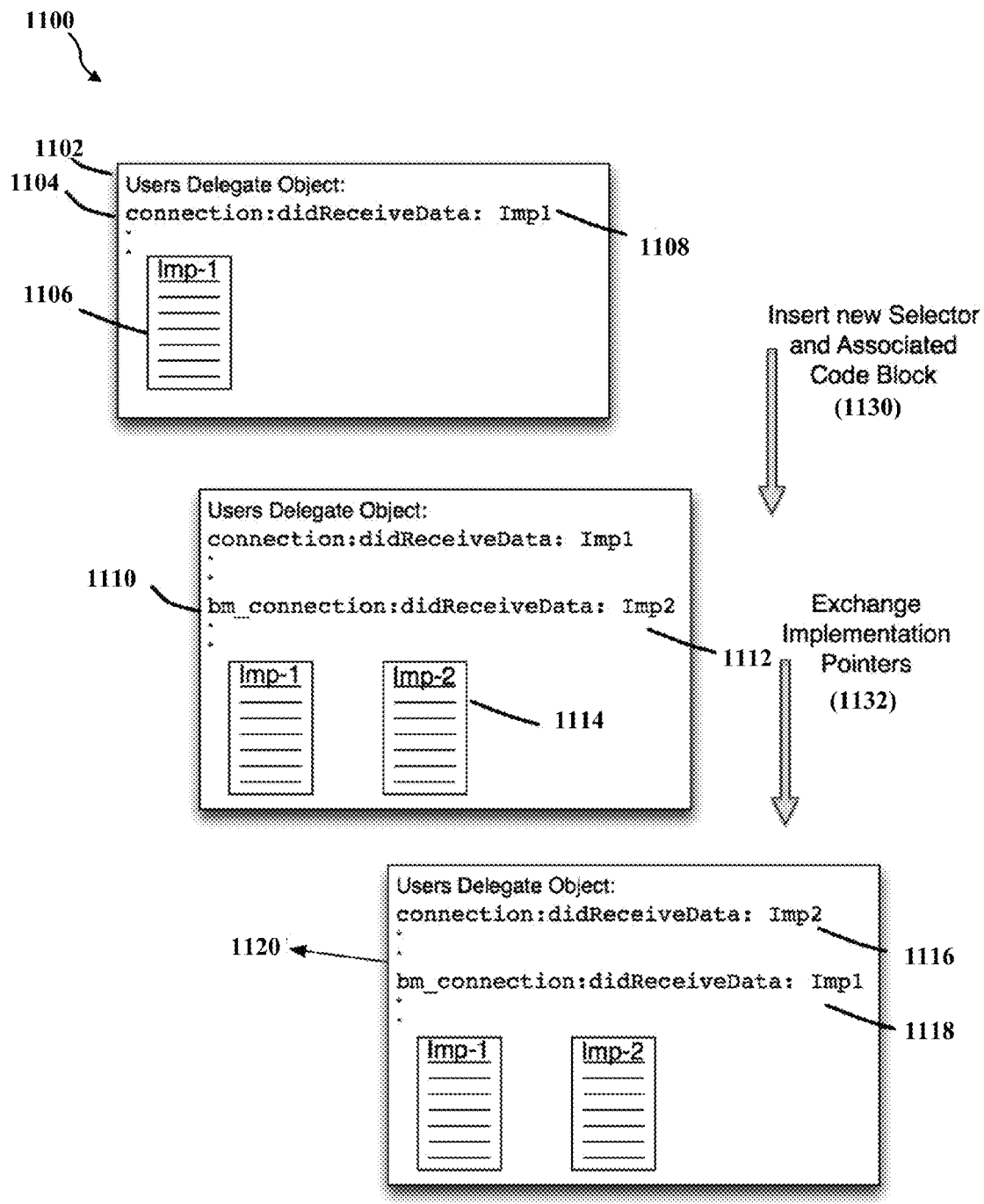
FIG. 11 illustrates code insertion into users delegate object for a Connection.

FIGS. 10 and 11 depict instrumentation of an object not in the documented frameworks. FIG. 10 depicts instrumentation of an object from the documented Foundation framework and FIG. 11 depicts instrumentation of an object not in the documented frameworks, namely the 'delegate' specified in the "initWithRequest:delegate" method of FIG. 10. The documentation may specify that the "delegate" object must support certain callbacks, and certain aspects of the present invention may be applied to the "delegate" object. This enables data in object outside of standard or documented frameworks to be tracked and collected. Specifically FIG. 11 illustrates how the "connectionDidReceiveData:" method can be tracked.

Other frameworks identified in FIG. 8 can be instrumented using techniques similar to those used for NSURLConnection, thereby enabling the present invention to track, analyze and report on how a given application makes use of the underlying documented frameworks in an Objective-C or other message-passing system. In certain embodiment, an application can be configured to avoid using the supplied frameworks, and thereby avoid being tracked by the disclosed techniques. However, many applications use Frameworks and can therefore be tracked and analyzed by the present invention with little to no requirement for modifying the application source code base.

In some embodiments, a library may be provided that comprises code blocks for instrumenting some or all of the methods in the Framework. Individual code blocks from the library may be selectively activated or deactivated based on configuration data maintained by the Library, typically in a file embedded in the Library. This file can, in turn, be remotely updated in a networked environment, thereby enabling individual instrumentation code blocks to be enabled or disabled remotely.

In some embodiments, code blocks instrumenting a framework may aggregate data from multiple method calls. The "connectionDidReceiveData" method depicted in FIG. 11 may be called hundreds of times and an author of the code block may prefer to simply sum the byte count of the data received and generate one aggregate report rather than reporting each individual method call.

In certain embodiments, the behavior of an application installed and executed on user equipment may be modified to perform functions that were beyond the original intent or purpose of the applications. For example, an original software developer when writing the code for the application may not have anticipated a need or desire identified by a user of the application. According to certain aspects of the invention, the Application may be modified "on-the-fly" to perform additional or different functions, without the need to modify the original source code. A change in behavior may be triggered by affirmative request of the user of the Application, a service provider that provides the Application, the user equipment, networking services (e.g. wireless networking) and/or a network-based or cloud-based application. A change in behavior may be automatically triggered based on information gathered by instrumentation modules. In one example, advertisements may be inserted into a user display. In another example, the user experience may be modified by altering certain "touch-and-feel" behaviors and/or appearances of user interface elements, including buttons, images, etc. The original software developer need not provide any features to enable such modifications. In one example, the internal parameters describing a broad selection of user interface elements may be accessed through the operating system, and/or runtime component 404, or other elements of a message-passing system. These parameters can be modified with an assurance that the modifications will have a known and desired effect.

Figure 12:
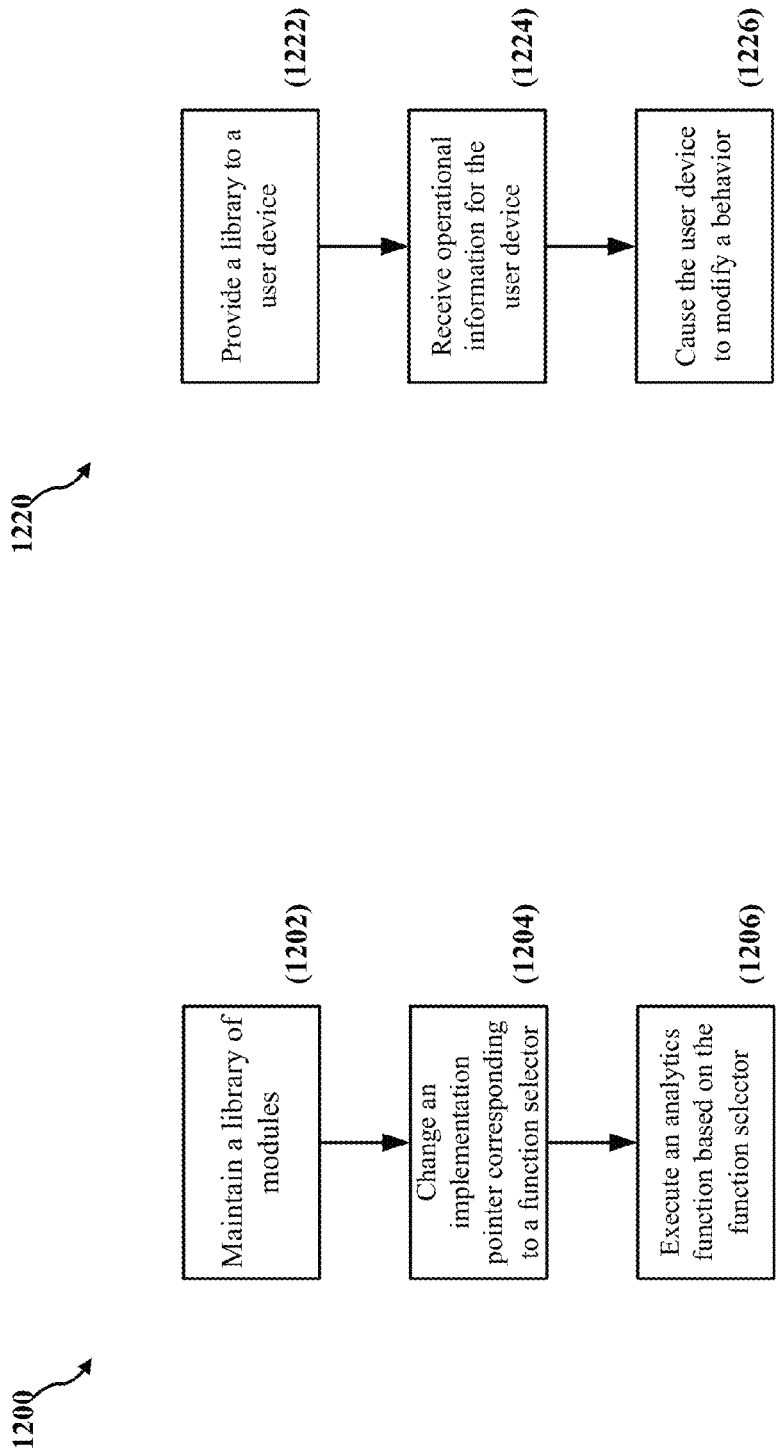
FIG. 12 is a flow chart of a method of code block exchange.

FIG. 12 includes a flow chart 1200 of a method of instrumenting applications and/or modifying the application. The method may be performed by a computing device such as a mobile phone, a smart phone, a personal computer, an appliance, or other device as desired.

At step 1202, a library of modules is received and/or maintained in a non-storage medium. The library may include code for causing a processing system to perform a plurality of analytics or other functions. Each analytics function or other function may be associated with a function selector. The code for causing the processing system to perform a plurality of analytics functions may be added to the library after the processing system has begun executing the application.

At step 1204, an implementation pointer maintained by the processing system and corresponding to a function selector of a target function may be changed. An initial content of the implementation pointer may be changed such that the processing system is caused to execute at least one of the plurality of analytics functions instead of the target function. The at least one analytics function may comprise a data collection function configured to update an execution history of the target function. The execution history may count or otherwise account for each execution of the target function. The at least one analytics function may comprise a cataloging function configured to characterize each execution of the target function based on one or more parameters provided to the target function. The cataloging function may characterize at least one result of each execution of the target function. The at least one analytics function may comprise a communications function that transmits information related to one or more operational aspects of the computing device to a network. The information related to one or more operational aspects of the computing device may include an analysis of user behavior associated with the computing device. The information related to one or more operational aspects of the computing device may include an alert related to an error condition caused by the application. The alert includes the execution history.

At step 1206, the initial content of the implementation pointer may be stored in association with the at least one analytics function such that the processing system is caused to execute the target function after executing the at least one analytics function. The implementation pointer may be changed after the processing system has begun executing an application associated with the implementation pointer.

In some embodiments, one or more other implementation pointers maintained by the processing system is changed such that an operational aspect of the application. The operational aspect of the application may relate to one or more of a user experience associated with the computing device and a behavior of the computing device.

FIG. 12 includes a flow chart 1220 of a method of instrumenting applications and/or modifying the application. The method may be performed by a network server, or other computing device.

At step 1222, a library is provided to a user device, which may comprise a computing device. The library may comprise analytics functions including functions configured to instrument a currently running application on the computing device.

At step 1224, operational information, which may include analytics data, corresponding to one or more functions of the user device and/or the application is received.

At step 1226, the user device is caused to modify a behavior of the application based on the analytics data. The user device maybe caused to take an action by exchanging one or more messages, commands, application data, libraries and/or library components with the user device. Such exchange may be facilitated by an agent provided to the user device that is adapted to modify a Runtime table 608 (see FIG. 6). The agent may be provided as a module of an operating system, a runtime component 404 (see FIG. 4), or the application or one of its libraries.

Modifying the behavior of the application may relate to an error condition detected in the application based on the operational information and the behavior may be modified by correcting the error condition or other malfunction. The behavior of the application may relate to a menu operation of the computing device, and may involve modifying a user experience associated with the user device or the application. The user experience may be defined by one or more of a touch and feel, a set of operational preferences, a sequence of operation, a power usage, a menu layout, and other interface elements.

In some embodiments, causing the computing device to modify the behavior of the application comprises causing the application to display an advertisement on the computing device based on the analytics data or by command of a network operator or service provider.

In some embodiments, causing the computing device to modify the behavior of the application comprises causing the computing device to modify a runtime version of the application without modifying a stored version of the application.

In some embodiments, the execution history is combined with corresponding execution histories received from a plurality of computing devices to obtain an aggregated history. The behavior of the application may be modified based on one or more of the execution history and the aggregated history. For example, advertisements may be provided based on user menu selections. In another example, an error condition may be diagnosed based on the aggregated history corresponding to multiple user devices.

System Description

Figure 13:
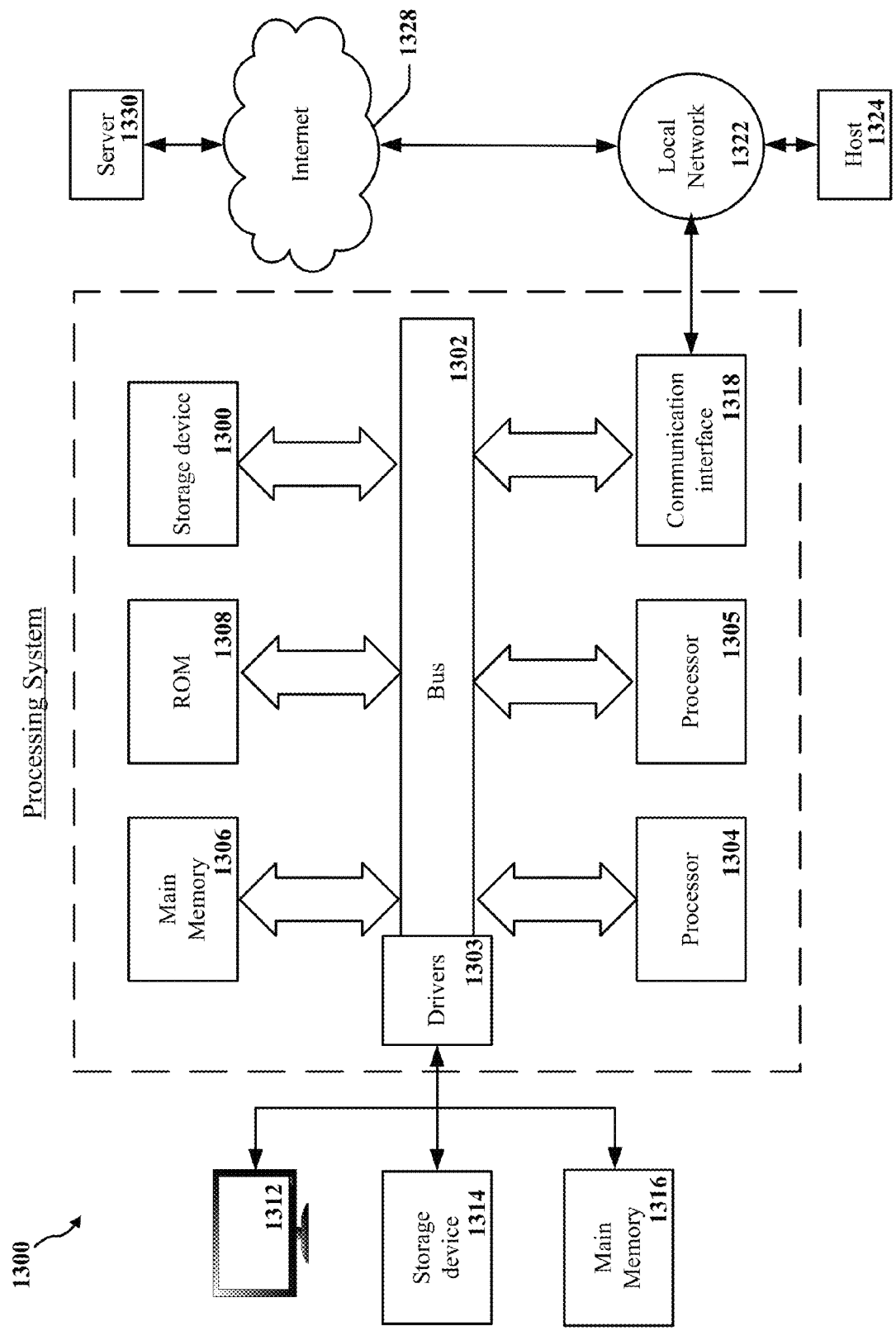
FIG. 13 is a simplified block schematic illustrating a processing system employed in certain embodiments of the invention.

Turning now to FIG. 13, certain embodiments of the invention employ a processing system that includes at least one processing system 1300 deployed to perform certain of the steps described above. Processing systems may be a commercially available system that executes commercially available operating systems such as Microsoft Windows®, UNIX or a variant thereof, Linux, iOS, a real time operating system and or a proprietary operating system. The architecture of the processing system may be adapted, configured and/or designed for integration in the processing system, for embedding in one or more of a portable processing device, a communications mobile device, an appliance, an image capture system, a manufacturing/machining system, a graphics processing workstation, etc. In one example, processing system 1300 comprises a bus 1302 and/or other mechanisms for communicating between processors, whether those processors are integral to the processing system 1300 (e.g. 1304, 1305) or located in different, perhaps physically separated processing systems 1300. Device drivers 1303 may provide output signals used to control internal and external components Processing system 1300 also typically comprises memory 1306 that may include one or more of random access memory ("RAM"), static memory, cache, flash memory and any other suitable type of storage device that can be coupled to bus 1302. Memory 1306 can be non-transitory and/or tangible storage media used for storing instructions and data that can cause one or more of processors 1304 and 1305 to perform a desired process. Main memory 1306 may be used for storing temporary data such as variables and intermediate information generated and/or used during execution of the instructions by processor 1304 or 1305. Processing system 1300 also typically comprises non-volatile and/or non-transitory storage such as read only memory ("ROM") 1308, flash memory, memory cards or the like; non-volatile storage may be connected to the bus 1302, but may equally be connected using a high-speed universal serial bus (USB), Firewire or other such bus that is coupled to bus 1302. Non-volatile storage can be used for storing configuration, and other information, including instructions executed by processors 1304 and/or 1305. Non-transitory storage may also include mass storage device 1310, such as a magnetic disk, optical disk, flash disk that may be directly or indirectly coupled to bus 1302 and used for storing instructions to be executed by processors 1304 and/or 1305, as well as other information.

Processing system 1300 may provide an output for a display system 1312, such as an LCD flat panel display, including touch panel displays, electroluminescent display, plasma display, cathode ray tube or other display device that can be configured and adapted to receive and display information to a user of processing system 1300. Typically, device drivers 1303 can include a display driver, graphics adapter and/or other modules that maintain a digital representation of a display and convert the digital representation to a signal for driving a display system 1312. Display system 1312 may also include logic and software to generate a display from a signal provided by system 1300. In that regard, display 1312 may be provided as a remote terminal or in a session on a different processing system 1300. An input device 1314 is generally provided locally or through a remote system and typically provides for alphanumeric input as well as cursor control 1316 input, such as a mouse, a trackball, etc. It will be appreciated that input and output can be provided to a wireless device such as a PDA, a tablet computer or other system suitable equipped to display the images and provide user input.

Processor 1304 executes one or more sequences of instructions. For example, such instructions may be stored in main memory 1306, having been received from a computer-readable medium such as storage device 1310. Execution of the sequences of instructions contained in main memory 1306 causes processor 1304 to perform process steps according to certain aspects of the invention. In certain embodiments, functionality may be provided by embedded processing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 1304 and/or 1305, particularly where the instructions are to be executed by processor 1304 and/or 1305 and/or other peripheral of the processing system. Such medium can include non-transitory storage, transitory storage and transmission media. Non-volatile storage may be embodied on media such as optical or magnetic disks, including DVD, CD-ROM and BluRay. Storage may be provided locally and in physical proximity to processors 1304 and 1305 or remotely, typically by use of network connection. Non-volatile storage may be removable from processing system 1304, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of processing system 1300. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 1304 and/or 1305. For example, the instructions may initially be retrieved from a magnetic disk of a remote computer and transmitted over a network or modem to processing system 1300. The instructions may optionally be stored in a different storage or a different part of storage prior to or during execution.

Processing system 1300 may include a communication interface 1318 that provides two-way data communication over a network 1320 that can include a local network 1322, a wide area network or some combination of the two. For example, an integrated services digital network (ISDN) may used in combination with a local area network (LAN). In another example, a LAN may include a wireless link. Network link 1320 typically provides data communication through one or more networks to other data devices. For example, network link 1320 may provide a connection through local network 1322 to a host computer 1324 or to a wide area network such as the Internet 1328. Local network 1322 and Internet 1328 may both use electrical, electromagnetic or optical signals that carry digital data streams.

Processing system 1300 can use one or more networks to send messages and data, including program code and other information. In the Internet example, a server 1330 might transmit a requested code for an application program through Internet 1328. The received code may be executed by a processor 1304 and/or 1305.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments provide a method and apparatus for capture and use of analytics data relating to the internal activity of software programs executing in the message passing runtime environment of Objective-C. Certain embodiments exploit the capabilities of Objective-C to insert data collection and analysis code into an application during the application's launch process. Modern applications designed for these environments make use of extensive and well documented Frameworks and Libraries. Certain embodiments exploit the information from these documented interfaces to gain knowledge of the underlying intent of the data collected.

Certain embodiments enable the inclusion of code blocks providing data collection, data analysis functions and user interface elements to be pulled from a compiled library and inserted into a pre-existing application while it is running. This frees software developers from having to modify the source code of an application in order to collect performance, usage and related analytics data.

Certain embodiments incorporate methods for minimizing the impact of the data collection on the executing application. In a networked environment, certain embodiments of the invention enable the profile of the data collected to be updated remotely. Certain embodiments provide methods for reduction of the volume of data collected by consolidation of multiple data points.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of modifying behavior of a computing device, comprising:

receiving at a computing device, a message transmitted by a server while the computing device is executing an application, wherein the computing device is exhibiting a first behavior while under control of the application;

responsive to the message, changing a first implementation pointer related to the application by replacing a first address stored in the implementation pointer with a second address, wherein the second address corresponds to a code block maintained in a library of modules on the computing device, and wherein changing the first implementation pointer modifies the first behavior; and storing the first address in a second implementation pointer, wherein the first implementation pointer is identified by a first function selector and the second implementation pointer is identified by a second function selector, wherein an address is stored in the implementation pointer during loading of the application, and the first address corresponds to a target function that is linked to the application, wherein invoking the first function selector after replacing the first address with the second address in the first implementation pointer causes the computing device to execute the code block, and wherein executing the code block includes invoking the second function selector such that the computing device is caused to execute the target function after execution of the code block.

2. The method of claim 1, wherein the computing device exhibits a second behavior different from the first behavior after replacing the first address with the second address in the first implementation pointer.

3. The method of claim 2, wherein the first behavior and the second behavior relate to a user experience associated with the computing device.

4. The method of claim 1, wherein the first behavior of the application relates to a menu operation of the computing device.

5. The method of claim 1, wherein changing the first implementation pointer modifies a sequence of operation of the computing device.

6. The method of claim 1, wherein changing the first implementation pointer modifies a menu layout.

7. The method of claim 1, wherein changing the first implementation pointer modifies a set of operational preferences associated with the computing device.

8. An apparatus comprising:
means for receiving at the apparatus, a message transmitted by a server while the apparatus is executing an application, wherein the apparatus exhibits a first behavior while under control of the application;
means for changing a first implementation pointer related to the application in response to the message, wherein the means for changing the first implementation pointer is configured to replace a first address stored in the implementation pointer with a second address, wherein the second address corresponds to a code block maintained in a library of modules on the apparatus, and wherein changing the first implementation pointer modifies the first behavior; and
means for storing the first address in a second implementation pointer, wherein the first implementation pointer is identified by a first function selector and the second implementation pointer is identified by a second function selector,
wherein an address is stored in the implementation pointer during loading of the application, and the first address corresponds to a target function that is linked to the application,
wherein invoking the first function selector after replacing the first address with the second address in the first implementation pointer causes the apparatus to execute the code block, and
wherein executing the code block includes invoking the second function selector such that the apparatus is caused to execute the target function after execution of the code block.

9. The apparatus of claim 8, wherein the apparatus exhibits a second behavior different from the first behavior after replacing the first address with the second address in the first implementation pointer.

10. The apparatus of claim 9, wherein the first behavior and the second behavior relate to a user experience associated with the apparatus.

11. The apparatus of claim 8, wherein the first behavior of the application relates to a menu operation of the apparatus.

12. The apparatus of claim 8, wherein a sequence of operation of the apparatus is modified after the first implementation pointer is changed.

13. The apparatus of claim 8, wherein a menu layout is modified after the first implementation pointer is changed.

14. The apparatus of claim 8, wherein a set of operational preferences associated with the apparatus is modified after the first implementation pointer is changed.

15. A non-transitory computer-readable medium comprising code for: receiving at a computing device, a message transmitted by a server while the computing device is executing an application, wherein the computing device is exhibiting a first behavior while under control of the application;
responsive to the message, changing a first implementation pointer related to the application by replacing a first address stored in the implementation pointer with a second address, wherein the second address corresponds to a code block maintained in a library of modules on the computing device, and wherein changing the first implementation pointer modifies the first behavior; and
storing the first address in a second implementation pointer, wherein the first implementation pointer is identified by a first function selector and the second implementation pointer is identified by a second function selector,
wherein an address is stored in the implementation pointer during loading of the application, and the first address corresponds to a target function that is linked to the application,
wherein invoking the first function selector after replacing the first address with the second address in the first implementation pointer causes the computing device to execute the code block, and
wherein executing the code block includes invoking the second function selector such that the computing device is caused to execute the target function after execution of the code block.

16. The computer-readable medium of claim 15, wherein the computing device exhibits a second behavior different from the first behavior after replacing the first address with the second address in the first implementation pointer, wherein the first behavior and the second behavior relate to a user experience associated with the computing device.

17. The computer-readable medium of claim 15, wherein the first behavior of the application relates to a menu operation of the computing device.

18. The computer-readable medium of claim 15, wherein a sequence of operation of the computing device is modified after the first implementation pointer is changed.

19. The computer-readable medium of claim 15, wherein a menu layout is modified after the first implementation pointer is changed.

20. The computer-readable medium of claim 15, wherein a set of operational preferences associated with the computing device is modified after the first implementation pointer is changed.

* * * * *